Figure 1:
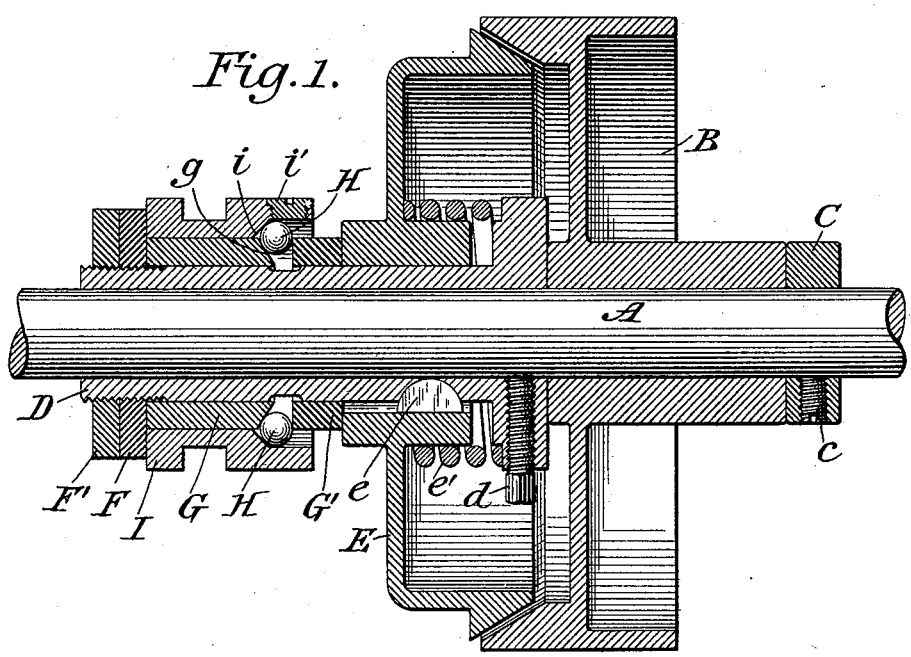

No. 614,951. Patented Nov. 29, 1898.
E. G. HOFFMANN.
CLUTCH.
(Application filed Feb. 9, 1897.)
(No Model.)

Attest:
A. N. Jesbera.
A. H. Scoble.

Inventor:
Ernest Gustav Hoffmann
by Redding, Kiddle & Greeley
Attys.

UNITED STATES PATENT OFFICE.

ERNEST GUSTAV HOFFMANN, OF NEW YORK, N. Y.

CLUTCH.

SPECIFICATION forming part of Letters Patent No. 614,951, dated November 29, 1898.

Application filed February 9, 1897. Serial No. 622,588. (No model.)

*To all whom it may concern:*

Be it known that I, ERNEST GUSTAV HOFFMANN, a subject of the Emperor of Germany, residing in the city and county of New York, in the State of New York, have invented certain new and useful Improvements in Clutches, &c., of which the following is a specification, reference being had to the accompanying drawings, forming a part hereof.

This invention relates to clutches, brakes, and other mechanical devices of like general nature in which the displacement of one member of the device must be effected from time to time, such displacement being of limited extent, but effected with considerable force—as, for example, in the case of a clutch in which the loose or movable clutch member must be forced under considerable pressure against the other clutch member. Various means have been devised hitherto for effecting the required movement of such a member with the necessary force, but so far as I am aware such means have not proved to be efficient and reliable under all conditions of use, or they are complicated, and therefore both cumbersome and expensive, as well as liable to get out of order. Moreover, they generally have projecting parts, which are highly objectionable when such devices are applied to rapidly-rotating shafts or wheels.

It is therefore the object of my invention to produce a device of this general character which shall be exceedingly simple in construction, very compact and free from projecting parts, and which, moreover, shall act with great force, shall be capable of application for many different purposes in substantially the same general form, and shall be certain in operation under all conditions of use.

In accordance with my invention I provide one or more loose bodies, preferably balls, which are forced with a wedge-like action between the bodily-movable member of the device and an abutment, the movement of the several bodies being preferably effected by the longitudinal movement of a sleeve with the periphery of which they are in contact. The several parts are so disposed and formed with relation to one another that the final effective movement of the movable member of the clutch or other device is made with great force.

It is obvious that my invention can be carried out in many different constructions as well as applied to many different uses; but in order to enable the nature and mode of operation of my invention to be fully understood I will describe the same hereinafter with reference to its embodiment in the construction chosen for illustration in the accompanying drawings, in which—

Figure 2:
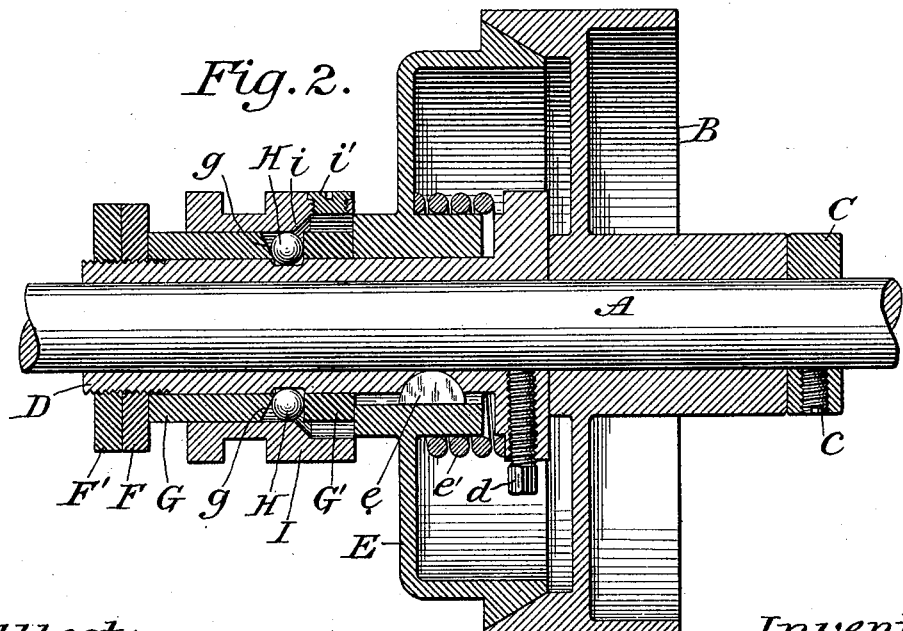

Figure 1 is a longitudinal central section of a clutch applied to a counter-shaft and embodying my invention, the clutch being represented as open. Fig. 2 is a similar view representing the clutch closed.

In the construction shown in the drawings a shaft A is represented as having mounted thereon a loose pulley B, which constitutes the female member of the clutch and is held from longitudinal movement on the shaft by a collar C and set-screw $c$. The other parts of the device are represented as mounted upon a sleeve D, which is held to the shaft by a set-screw $d$; but this is merely for the purpose of enabling all of the parts to be removed and replaced together, it being obvious that they might be supported directly upon the shaft.

The male member E of the clutch is represented as held to the sleeve D to rotate therewith, but with freedom to move longitudinally thereon, by a key $e$, while a spring $e'$ may be provided to thrust the movable member E of the clutch normally away from the member B. A rigid abutment is formed by nuts F F', applied to the sleeve D, and for convenience in manufacture I prefer to interpose between the abutment and the clutch member E two short sleeves or rings G G', although it is evident that such sleeves or rings might be formed as parts of the abutment and of the clutch member, if desired. The opposing faces of the sleeves or rings G G' are preferably shaped so as to form between them a flaring opening, one or both of said faces being inclined, as convenience may suggest. In the construction shown in the drawings the face $g$ of the ring G alone is inclined. One or more movable bodies, preferably balls H H, are so disposed and supported that they can be forced in between the opposing faces of the rings or sleeves G G'—that is to say, between the abutment and the bodily-movable member of the device—thereby producing the required movement of said movable member. It will be evident that such bodies or balls have a wedge-like action and that as they are forced in between the fixed abutment and the movable member of the device the latter will be moved with great force in the required direction, and that as soon as the pressure on said bodies or balls is removed they will be forced out again and the clutch may be opened by the action of the spring $e'$. For the purpose of effecting the movement of the bodies or balls H H, I have provided a sleeve I, which may be grooved circumferentially for engagement by a suitable actuating-lever and is preferably provided for contact with the bodies or balls H H with an inclined or cam surface $i$. For convenience in moving or replacing the bodies or balls H H the said sleeve I may be tapped and fitted with a screw-plug $i'$, which can be readily removed when necessary.

The nature and mode of operation of my improved device will be readily understood from the foregoing description of the construction and relation of its parts, as shown in the drawings. When the clutch is open the sleeve I is withdrawn to its full extent and the bodies or balls H H remain in their outward positions, both by reason of the inclination of the face $g$ of the sleeve G and by reason of centrifugal action. If it is desired to close the clutch, the sleeve I is shifted, and in its movement it forces the bodies or balls H H between the sleeves G G'—that is to say, between the abutment and the movable member of the device—and forces the movable member E against the stress of the spring $e'$. During the last of the movement of the sleeve I the movement of the bodies or balls H H in a plane transverse to the axis of the device is very slight, and hence the final movement of the said member E takes place with great force. The necessary adjustment of the device may be effected by shifting the nuts F F', which constitute the fixed abutment.

It will be observed that by the employment of balls the sleeve I or whatever other part performs its function is permitted to move over or outside of the balls when in their inward position, thereby retaining them in such position and making the clutch or other device self-locking, relieving the actuating-lever of all strain.

It will be obvious that the invention may be embodied in many other constructions than that described herein and that I do not intend to limit my invention to the precise construction shown in the drawings.

I claim as my invention—

1. In a device of the character described the combination with a movable member and an abutment, of one or more movable balls and means to force said balls radially between said abutment and said movable member and by inclosing said balls to hold them in place, whereby the device is self-locking.

2. In a device of the character described the combination with a movable member and an abutment, one of the opposing faces of said parts being inclined, of one or more movable balls and means to force said balls radially between said abutment and said movable member and by inclosing said balls to hold them in place, whereby the device is self-locking.

3. In a device of the character described the combination with a movable member and an abutment, of one or more movable bodies and a sleeve movable longitudinally in contact with said bodies to force them between said abutment and said movable member.

4. In a device of the character described the combination with a movable member and an abutment, of one or more movable bodies and a sleeve movable longitudinally and having an inclined or cam surface for contact with said bodies to force them between said abutment and said movable member.

5. In a device of the character described the combination with a movable member and an abutment, of one or more balls and means to force said balls radially between said abutment and said movable member and by inclosing said balls to hold them in place, whereby the device is self-locking.

6. In a device of the character described the combination with a movable member and an abutment, one of the opposing faces of said parts being inclined, of one or more balls and means to force said balls radially between said abutment and said movable member and by inclosing said balls to hold them in place, whereby the device is self-locking.

7. In a device of the character described the combination with a movable member and an abutment, of one or more balls, and a sleeve movable longitudinally in contact with said balls to force them between said abutment and said movable member.

8. In a device of the character described the combination with a movable member and an abutment, of one or more balls and a sleeve movable longitudinally and having an inclined or cam surface for contact with said balls to force them between said abutment and said movable member.

9. In a device of the character described the combination with a movable member and an abutment, of one or more movable bodies and a sleeve movable longitudinally in contact with said bodies to force them between said abutment and said movable member, said sleeve having a hole to permit the removal and insertion of said bodies and having a plug to close said hole.

10. In a clutch, the combination with the longitudinally-immovable clutch member, the movable clutch member, and an abutment, of one or more movable bodies and a sleeve longitudinally movable in contact with said bodies to force them between said abutment and said movable member.

11. The combination with a shaft, a clutch member mounted on said shaft, a sleeve also mounted on said shaft, and the second clutch member mounted on said sleeve, of an abutment fixed on said sleeve, one or more movable bodies and means to force said bodies between said abutment and said movable member and by inclosing said balls to hold them in place, whereby the device is self-locking.

This specification signed and witnessed this 5th day of February, A. D. 1897.

ERNEST GUSTAV HOFFMANN.

In presence of—
  W. B. GREELEY,
  F. M. EGGLESTON.